(12) United States Patent
Vasseur

(10) Patent No.: US 8,605,619 B2
(45) Date of Patent: *Dec. 10, 2013

(54) DYNAMIC TE-LSP PRIORITY AND PREEMPTION

(75) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/323,386

(22) Filed: Dec. 12, 2011

(65) Prior Publication Data

US 2012/0082034 A1 Apr. 5, 2012

Related U.S. Application Data

(63) Continuation of application No. 11/121,685, filed on May 4, 2005, now Pat. No. 8,107,379.

(51) Int. Cl.
*H04J 1/16* (2006.01)
*H04L 12/56* (2011.01)

(52) U.S. Cl.
CPC .................................. *H04L 47/10* (2013.01)
USPC .......................................... 370/252; 370/229

(58) Field of Classification Search
USPC .............. 370/229–235, 238, 252, 253, 395.2, 370/395.21
See application file for complete search history.

(56) References Cited

U.S. PATENT DOCUMENTS

| | | | |
|---|---|---|---|
| 5,832,197 A | 11/1998 | Houji | |
| 6,111,877 A | 8/2000 | Wilford et al. | |
| 6,473,424 B1 | 10/2002 | DeJager et al. | |
| 6,603,765 B1 | 8/2003 | Wilford et al. | |
| 6,665,273 B1 | 12/2003 | Goguen et al. | |

(Continued)

FOREIGN PATENT DOCUMENTS

| | | |
|---|---|---|
| EP | 06769912.4 | 9/2009 |
| JP | 2002-057702 | 2/2002 |
| WO | WO-02/062012 A2 | 8/2002 |

OTHER PUBLICATIONS

Meyer, Matthew R., et al., IETF Internet Draft, entitled MPLS Traffic Engineering Soft Preemption (draft-ietf-mpls-soft-preemption-04. txt), Apr. 2005, 1-12.

(Continued)

*Primary Examiner* — Kan Yuen
(74) *Attorney, Agent, or Firm* — Novak Druce Connolly Bove + Quigg LLP

(57) ABSTRACT

In one embodiment, a node of a computer network receives a request to establish a traffic engineering (TE) label switched path (LSP). The node accesses a pre-defined range of preemption-priority values that may be used with the requested TE-LSP. The node determines a preemption-priority value at which adequate network resources to accommodate the requested TE-LSP would be available that is as low as possible within the pre-defined range of preemption-priority values. The node signals the requested TE-LSP with the determined preemption-priority value. The node receives notifications from one or more other nodes within the computer network indicating information about other TE-LSPs that would be preempted if the requested TE-LSP were established at the determined preemption-priority value. In response to the information regarding other TE-LSPs that would be preempted, the node determines whether to proceed with establishment of the requested TE-LSP at the determined preemption-priority value.

20 Claims, 10 Drawing Sheets

(56) References Cited

U.S. PATENT DOCUMENTS

| | | | |
|---|---|---|---|
| 6,667,975 | B1 | 12/2003 | DeJager et al. |
| 6,778,492 | B2 | 8/2004 | Crarny et al. |
| 6,856,991 | B1 | 2/2005 | Srivastava |
| 6,885,638 | B2 | 4/2005 | Xu et al. |
| 7,058,845 | B2 * | 6/2006 | Fujita .......................... 714/4.2 |
| 7,283,477 | B1 | 10/2007 | Fedyk et al. |
| 7,319,700 | B1 * | 1/2008 | Kompella ................. 370/400 |
| 2002/0141345 | A1 * | 10/2002 | Szviatovszki et al. ........ 370/238 |
| 2002/0156914 | A1 | 10/2002 | Lo et al. |
| 2003/0039246 | A1 * | 2/2003 | Guo et al. ................... 370/389 |
| 2003/0095509 | A1 | 5/2003 | Ramanan et al. |
| 2003/0112749 | A1 | 6/2003 | Hassink et al. |
| 2004/0186701 | A1 | 9/2004 | Aubin et al. |
| 2006/0036892 | A1 | 2/2006 | Sunna |
| 2008/0043740 | A1 * | 2/2008 | Doverspike et al. .......... 370/392 |
| 2008/0101239 | A1 | 5/2008 | Goode |

OTHER PUBLICATIONS

Lindem, A., et al., Network Working Group Internet Draft, entitled Extensions to OSPF for Advertising Optional Router Capabilities (draft-ietf-ospf-cap-06.txt), Feb. 2005, 1-14.

Callon, R., RFC 1195, entitled Use of OSI ISIS for routing in TCP/IP and Dual Environments, Dec. 1990, pp. 1-80.

Rekhter, Y. RFC 1771, entitled A Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J. RFC 2328, entitled OSPF Version 2, Apr. 1998, pp. 1-183.

Herzog, S. RFC 2750, entitled RSVP Extensions for Policy Control, Jan. 2000, 1-13.

Herzog, S. RFC 3181, entitled Signaled Preemption Priority Policy Element, Oct. 2001, 1-12.

Awduche, D., RFC 3209, entilted RSVP-TE: Extensions to RSVP for LSP Tunnels, Dec. 2001, 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E. RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

Vasseur, Jean-Philippe, et al., Internet Draft entitled, IS-IS MPLS Traffic Engineering Capabilities (draft-vasseur-isis-te-caps-00.txt), Jul. 2004, 1-15.

Le Faucheur, Francois, "Russian Dolls Bandwidth Constraints Model for Diff-Serv-Aware MPLS Traffic Engineering", TEWG Internet Draft, Dec. 2004, 13 pages.

de Oliveira, J. et al., "LSP Preemption Policies for MPLS Traffic Engineering", IETF Internet Draft, Jan. 2005, 17 pages.

PCT Notification of Transmittal of the International Search Report and the Written Opinion of the International Searching Authority, or the Declaration, International Appl. No. PCT/US2006/016211, International Filing Date: Apr. 27, 2006, Date of Mailing: Feb. 7, 2008, 8 pages.

* cited by examiner

PRIORITY RANGES TABLE 500

| TYPE 505 | SIZE (MBps) 510 | PRIORITY RANGE 515 |
|---|---|---|
| VOICE | 8.1 ↑ | 0 |
| VOICE | 3.1 - 8 | 4 - 1 |
| VOICE | 1.1 - 3 | 4 - 3 |
| VOICE | 0 - 1 | 4 |
| DATA | ALL | 7 - 5 |
| OTHER | 9.1 ↑ | 7 - 6 |
| OTHER | 0 - 9 | 7 |

ENTRIES 520

FIG. 5

DYNAMIC TE-LSP PRIORITY AND PREEMPTION

RELATED APPLICATIONS

The present application is a continuation of U.S. application Ser. No. 11/121,685, titled "Dynamic TE-LSP Priority and Preemption", filed on May 4, 2005 by Jean-Philippe Vasseur, the contents of which are incorporated by reference herein in their entirety.

BACKGROUND OF THE INVENTION

1. Field of the Invention

The present invention relates to computer networks, and more particularly to dynamically assigning priority of load balancing Traffic Engineering (TE) label switched paths (LSPs) of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SO-NET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource reSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, which is hereby incorporated by reference in its entirety. In the case of traffic engineering applications, RSVP signaling is used to establish a TE-LSP and to convey various TE-LSP attributes to routers, such as border routers, along the TE-LSP obeying the set of required constraints whose path may have been computed by various means.

As defined in RFC 2205, an RSVP data flow is "admitted" and resources allocated to the data flow using a capacity-based admission control technique. According to this technique, resources are allocated to data flows on a "first-come-first-admitted" basis until the capacity of the resources is exhausted. S. Herzog, *RSVP Extensions for Policy Control*, RFC 2750, which is hereby incorporated by reference in its entirety, defines an extension to RFC 2205 that incorporates policy-based admission control. Through this extension to RSVP, admission control involves reserving resources on a policy basis in addition to using capacity as a basis. A simple example of such is an authentication/authorization policy. If a requestor attempts to reserve bandwidth but is unknown to the administration or makes an unauthorized request, the request will be denied based on the authentication/authorization policy even though bandwidth is available. But among authorized requestors, bandwidth is granted on a first-come-first-admitted basis.

A policy often employed in conjunction with RFC 2750 is a preemption-priority-based policy described in S. Herzog, *Signaled Preemption Priority Policy Element*, RFC 3181, which is hereby incorporated by reference in its entirety. The preemption-priority-based policy incorporates a technique that allows a new reservation to preempt one or more existing lower priority reservations in order to acquire resources reserved for the lower priority reservations. According to the technique, a preemption-priority value is associated with a new reservation and defending-priority values are associated with respective existing reservations. The reservations' preemption and defending priority values may be assigned in various ways known in the art. The preemption-priority value for the new reservation is compared with the defending-priority values of existing reservations to determine if the new reservation "preempts" any existing lower priority reservations. If so, resources allocated to selected lower priority reservations are reallocated for the new reservation. Notably, techniques for preemptions applied to MPLS TE-LSPs are described in detail in above-incorporated RFC 3209.

In practice, for example in the case of MPLS TE-LSP, an RSVP signaling message (e.g., a Path message) contains a specified preemption-priority value associated with the new TE-LSP. A network node that receives the message may first determine if sufficient unallocated resources are immediately available to satisfy the resources requested in the message. If not, the node then may identify lower priority existing reservations (TE-LSPs) that may be preempted to meet the needs of the new reservation. This may be done by comparing the new TE-LSP preemption priority value with the defending priority value of existing TE-LSPs to determine if the new TE-LSP is higher in priority than the existing TE-LSP. If so, the network node may preempt the existing TE-LSP by "tearing it down" and reallocating the resources associated with the torn down TE-LSP(s) to the new TE-LSP. Thereafter, an error message (e.g., a Path Error message) is sent upstream along the data path to notify the upstream nodes, including the source node, of the preemption.

Notably, the above-described preemption technique may cause lower priority reservations to be preempted immediately ("hard" preemption), thus causing unnecessary disruption to data flows associated with these reservations. For example, to "reclaim" the resources lost due to preemption, the lower priority TE-LSPs would have to be reestablished, causing a possible interruption to the data flow. A method to alleviate this situation is described in Meyer, et al. *MPLS Traffic Engineering Soft Preemption <draft-ietf-mpls-soft-preemption-04.txt>*, Internet Draft, April 2005, which is hereby incorporated by reference in its entirety. Briefly, the method described therein introduces a "preemption pending" state to create a "soft" preemption, which helps to more gracefully mitigate the reroute process of the displaced data flows carried within the preempted TE-LSP(s). Particularly, for a specified period of time while soft preemption is activated, head-end LSRs of soft preempted data flows are notified of the preemption and given the opportunity to reroute the data flow before it is hard preempted. In essence, reservations along the higher priority data flow are overbooked until the lower priority data flow has been given a chance to be rerouted.

Often, computation of TE-LSPs (data flows) are non-synchronized, such that each TE-LSP path is calculated separately from one another, either by multiple head-end nodes, or by a single head-end node or PCE, but at different times. As a result of the non-synchronized computations, resources, e.g., bandwidth, may become fragmented, which may lead to a "blocking" state where some TE-LSPs may not be established (or resized). For example, assume that there are two links from one location to another, where each link has an available 10 Mega-bytes per second (MBps) of bandwidth. Further assume that a first TE-LSP is established over the first link reserving 3 MBps, and a second TE-LSP is established over the second link reserving another 3 MBps. Each link thus has 7 MBps of bandwidth available, and the total available bandwidth across both links is 14 MBps. Should a third TE-LSP attempt to be established reserving 8 MBps of bandwidth, however, neither the first or second links could support such a reservation, even though across both links there is a combined available bandwidth of 14 MBps. This is because the 14 MBps of available bandwidth has been fragmented across the two links (into two 7 MBps links), preventing the ability to find a satisfactory path (of 8 MBps).

It would be possible to satisfy the third TE-LSP of 8 MBps if the other TE-LSPs could be displaced and "re-packed" accordingly onto a single link. In this case, for instance, the first link would have 4 MBps of available bandwidth (10–3–3), and the second link would have 2 MBps (10–8). One way to achieve this situation involves allocating different priorities to the TE-LSPs based on their bandwidth sizes, so as to increase the possibility of being able to place larger TE-LSPs that could preempt lower priority (hence smaller) TE-LSPs. Once preempted, the smaller TE-LSPs would have a better chance of finding a satisfactory path and would thus be rerouted, thereby creating a form of re-packing. Currently, this approach is static and requires an arbitrary priority assignment by a system administrator with knowledge of the network. Moreover, such a static configuration may lead to situations where a large number of smaller TE-LSPs is preempted, which may not be re-routable in order to place the larger TE-LSP.

SUMMARY OF THE INVENTION

The present invention is directed to a technique for dynamically assigning priorities to traffic engineering (TE) label switched paths (LSPs) from a head-end node of a computer network. The novel technique increases the ability to place TE-LSPs that would be otherwise blocked by bandwidth fragmentation. Specifically, a head-end node allocates a range of priority values for groups of possible TE-LSP configurations, such as, e.g., groups by type and/or size of the possible TE-LSPs. When requesting a TE-LSP, the head-end node attempts to establish the TE-LSP by dynamically increasing a priority value of the TE-LSP within the corresponding range of priority values until adequate resources are available, at which time the head-end node may establish the TE-LSP. Upon expiration of a configurable timer, the head-end node dynamically decreases the priority value of the established TE-LSP within the corresponding range of priority values and determines whether the established TE-LSP can lower its priority yet still obtain adequate resources along a path with an acceptable cost. If so, the head-end node may reestablish the TE-LSP at the lower priority value.

In accordance with one aspect of the present invention, the head-end node (e.g., a system administrator) assigns priority ranges to groups of possible TE-LSPs. Groups of possible TE-LSPs may comprise, e.g., various size configurations, TE-LSP type configurations, or other configurations, as well as any combinations of configurations. For example TE-LSPs requiring larger amounts of bandwidth (larger TE-LSPs) might be given a higher range of priority values than smaller TE-LSPs. Also, TE-LSP types (Class Types, CTs) may be assigned different ranges, such as, e.g., a higher range for sensitive data flows (e.g., Voice over Internet Protocol, VoIP or "voice") versus a lower range for less-sensitive data flows (e.g., data). Notably, while overlapping ranges are permitted, non-overlapping ranges may be assigned in order to assure desired preemption isolation across TE-LSP types, such as between voice and data.

In accordance with another aspect of the present invention, the head-end node attempts to establish a TE-LSP by dynamically increasing a priority value of the TE-LSP within the corresponding range of priority values until adequate resources are available. The head-end node begins with the lowest value within the range, and then steadily increments that priority value within the range, while attempting to obtain adequate resources for the TE-LSP at each incremented priority level. Notably, the head-end node may either attempt to signal the establishment of the TE-LSP at each priority level, or it may instead perform a lookup to a locally stored list of current TE-LSPs and their priorities to determine (internally) whether adequate resources exist prior to signaling the TE-LSP. In the event the head-end node is configured to soft preempt, one or more remote head-end nodes of the soft-preempted TE-LSPs may send a notification indicating a burden on the remote head-end node to reroute its soft-preempted TE-LSP(s). If the head-end node of the preempting TE-LSP receives too many notifications, or "complaints," it may decide to cancel (retract) the soft-preemption. Otherwise, the TE-LSP is established, and the soft-preempted TE-LSPs are ultimately preempted and must be rerouted, if possible.

In the illustrative embodiment described herein, the complaints are transmitted using Interior Gateway Protocol (IGP) messages. Each remote head-end node of a preempted TE-LSP may create an IGP message that is used to propagate ("advertise") the number of preempted TE-LSPs, particularly preempted TE-LSPs that it is unable to re-route, to other head-end nodes (e.g., the preempting nodes) or PCEs in its domain, e.g., its IGP area/level. The IGP message may also indicate other information about the preempted TE-LSPs, such as their respective priorities and/or sizes. The IGP message is illustratively embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the preempted TE-LSP information.

In accordance with still another aspect of the present invention, upon expiration of a configurable timer, the head-end node of the preempting TE-LSP dynamically decreases the priority value of the established TE-LSP within the corresponding range of priority values and determines whether the TE-LSP can lower its priority yet still obtain adequate resources. The head-end node begins with the current priority value, and then steadily decrements that priority value within the range, while determining if adequate resources for the TE-LSP would be available at each lower priority level (e.g., either by signaling or local determination). The head-end node may then reestablish the TE-LSP at the lowest priority value within the range that still results in available resources. Notably, the head-end node may first determine whether a reestablished TE-LSP has an acceptable cost as compared to a cost of the current established TE-LSP, prior to reestablishing the TE-LSP.

Advantageously, the novel technique dynamically assigns priorities to TE-LSPs of a computer network based on pre-defined priority ranges for groups of possible TE-LSPs. By dynamically adjusting the priority of TE-LSPs within the ranges, the inventive technique provides a mechanism for increasing the possibility of being able to place more TE-LSPs throughout a network, without arbitrary (and sometimes cumbersome) static assignments. Also, the novel technique advantageously prevents situations where a large number of smaller TE-LSPs is preempted which may not be re-routable in order to place a larger TE-LSP.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of portions of an exemplary priority ranges table that may be advantageously used with the present invention;

DETAILED DESCRIPTION OF AN ILLUSTRATIVE EMBODIMENT

Figure 1:
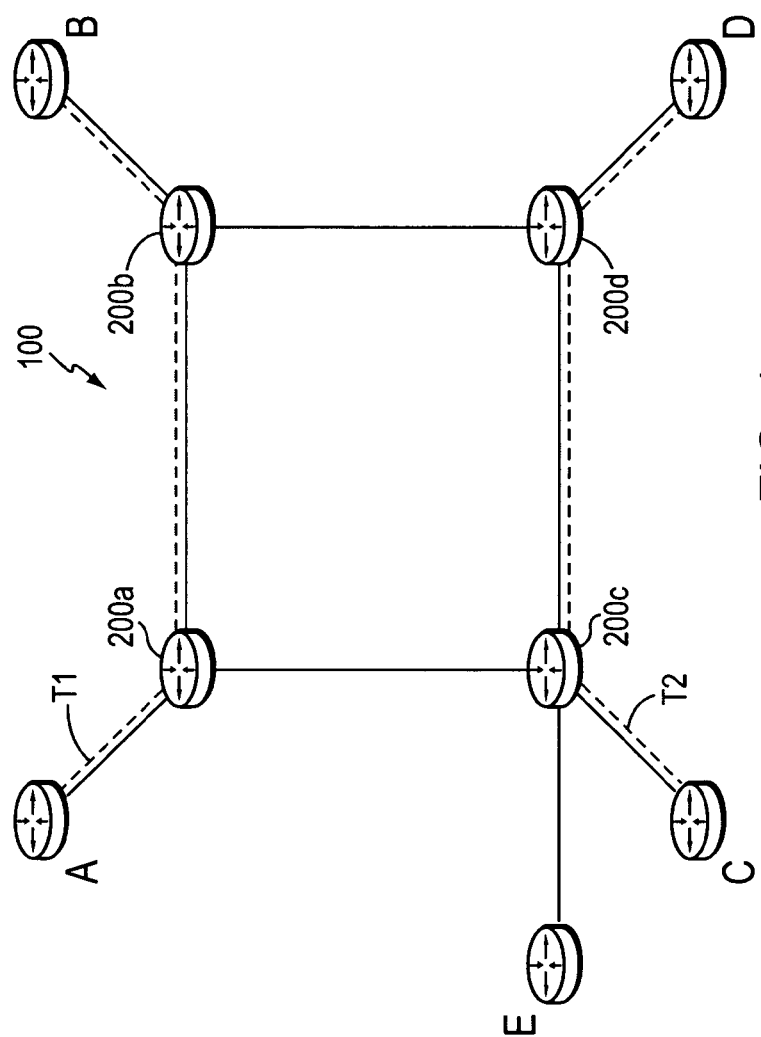
FIG. 1 is a schematic block diagram of an exemplary computer network that may be used in accordance with the present invention.

FIG. 1 is a schematic block diagram of an exemplary computer network 100 comprising routers A-E (e.g., end routers) interconnected by routers 200a-d (e.g., intermediate routers), through links as shown. Notably, computer network 100 may be any arrangement of various types of routers, nodes, and links, such as, e.g., a network of edge routers (A-E) and core routers (200), as understood by those skilled in the art. Assume that each link in the computer network 100 has a cost value of 1, and that each link from routers 200 to routers A-E have unlimited available bandwidth, while the links interconnecting the routers 200 have a maximum available bandwidth of 10 Mega-bytes per second (MBps). Those skilled in the art will understand that any number of routers, nodes, and links may be used in the computer network, and that the view shown herein is for simplicity.

Data packets may be exchanged among the computer network 100 using pre-defined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
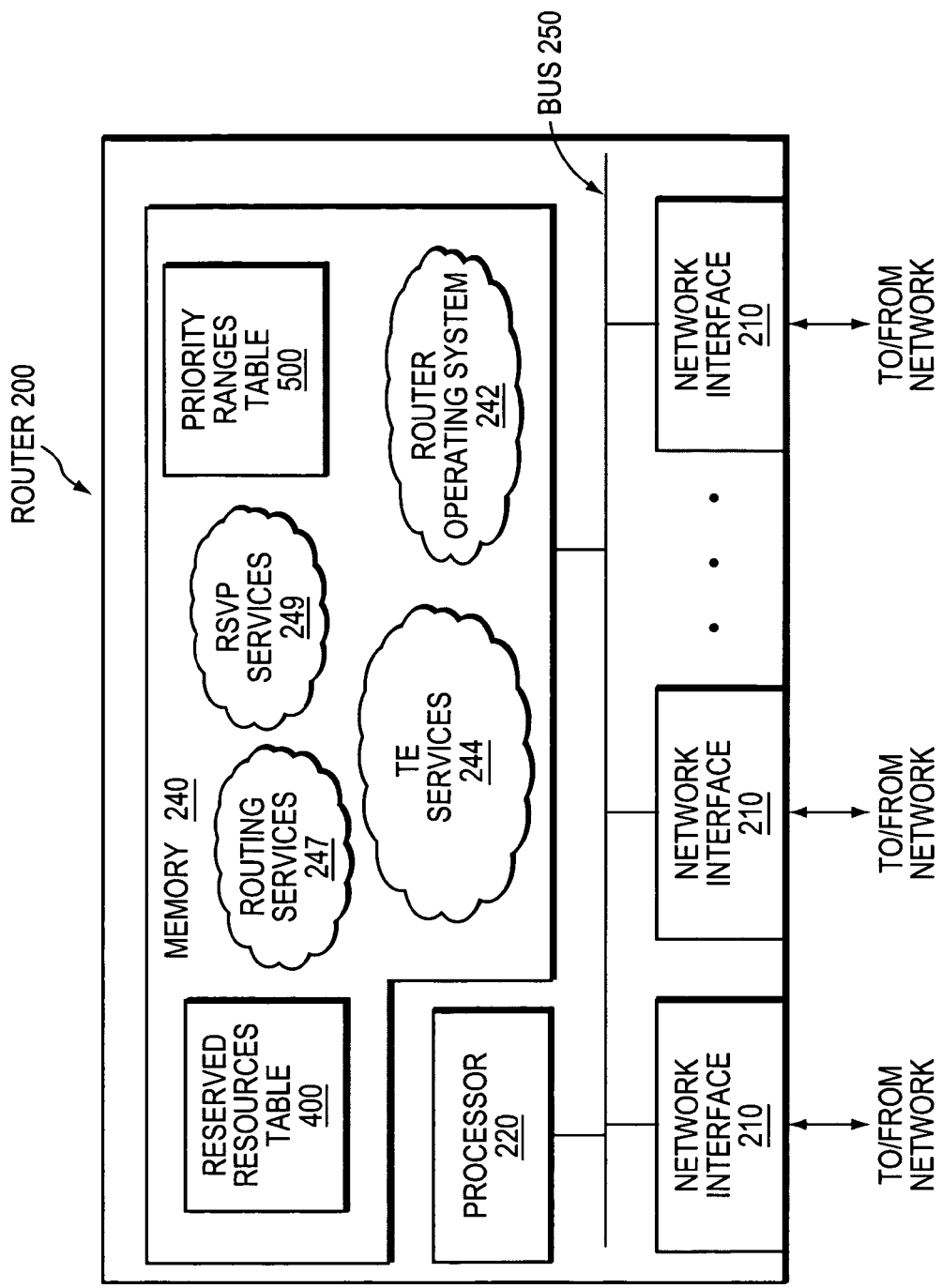
FIG. 2 is schematic block diagram of an exemplary router that may be advantageously used with the present invention.

FIG. 2 is a schematic block diagram of an exemplary router 200 that may be advantageously used with the present invention, e.g., as routers 200 and/or routers A-E of FIG. 1. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as Reserved Resources Table 400 and Priority Range Table 500. A router operating system 242, portions of which is typically resident in memory 240 and executed by the processor, functionally organizes the router by, inter alia, invoking network operations in support of software processes and/or services executing on the router. These software processes and/or services include routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP and Border Gateway Protocol (BGP). These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. RSVP services 249 contain computer executable instructions for implementing RSVP and processing RSVP is messages in accordance with the present invention. RSVP is described in Request for Comments (RFC) 2205, entitled *Resource ReSerVation Protocol (RSVP)*, RFC 2750, entitled *RSVP Extensions for Policy Control*, RFC 3181, entitled *Signaled Preemption Priority Policy Element*, and in RFC 3209, entitled *RSVP-TE: Extensions to RSVP for LSP Tunnels*, all as incorporated above.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

Figure 3:
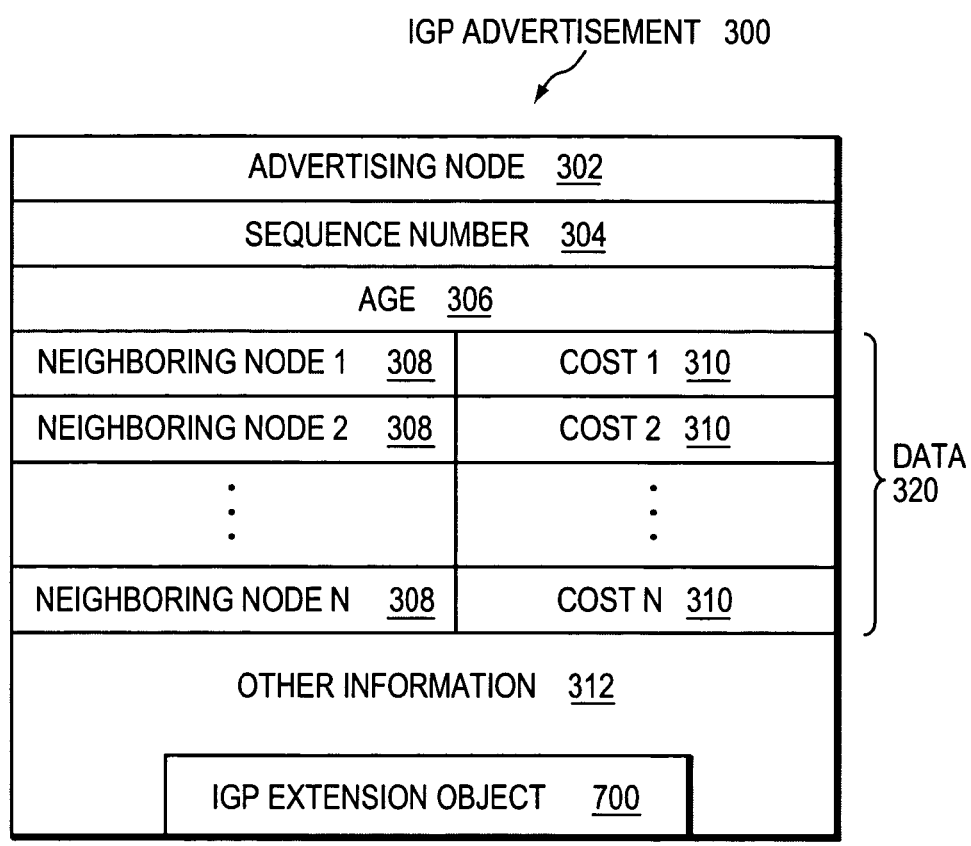
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 may include one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an IGP Extension Object 700 (described further below). Generally, the received IGP Advertisements are stored in a Link-State Database (LSDB) of the router 200 (not shown), or in some cases in a TE Database of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the dashed lines (T1 and T2) between a head-end nodes (A and C, respectively) and a tail-end nodes (B and D, respectively) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages*, Internet Draft, July 2004, which is hereby incorporated by reference as though fully set forth herein. It should be understood that the use of RSVP serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

In accordance with RSVP-TE, to establish a data path for the TE-LSP between a sender (e.g., head-end node A) and a receiver (e.g., tail-end node B), the sender may send an RSVP path (Path) message (not shown) downstream hop-by-hop along a path (e.g., a unicast route) to the receiver to identify the sender and indicate e.g., bandwidth needed to accommodate the data flow, along with other attributes of the TE-LSP. The Path message may contain various information about the TE-LSP including, e.g., various characteristics of the TE-LSP. To establish a TE-LSP (data flow) between the receiver and the sender, the receiver may return an RSVP Reserve (Resv) message (not shown) upstream along the path to the sender to confirm the attributes of the TE-LSP, and provide a TE-LSP label. It should be noted that in accordance with RSVP signaling, the state of the RSVP is refreshed on a timed interval, e.g., every thirty seconds, in which RSVP Path and Resv messages are exchanged. This timed interval is configurable by a system administrator.

A session attribute object that may be used with the present invention in the RSVP signaling messages (Path or Resv) is described in above-referenced RFC 3209. The session attribute object (not shown) contains a preemption value that defines a preemption priority of the TE-LSP associated with the signaling message. The preemption priority represents a relative importance of the reservation (TE-LSP) with respect to a set of admitted (existing) TE-LSPs in the network. Those skilled in the art will understand that any range of priority values may be used in accordance with the present invention, but for illustrative purposes as used herein, priorities range from 7 (lowest) to 0 (highest).

Figure 4:
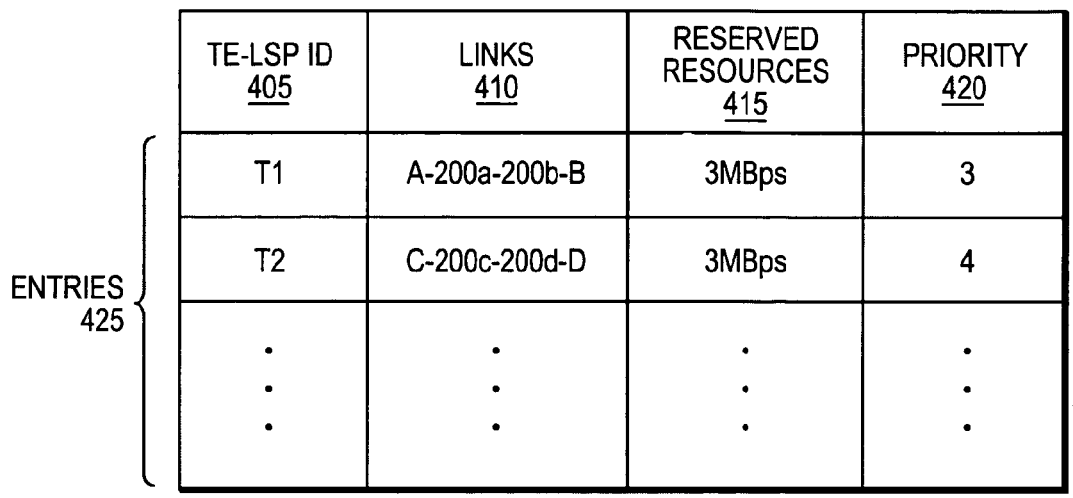
FIG. 4 is a schematic block diagram of portions of an exemplary reserved resources table that may be advantageously used with the present invention.

FIG. 4 is a schematic block diagram of portions of an exemplary reserved resources table 400 that may be advantageously used with the present invention. The reserved resources table 400 contains a plurality of fields 425 that list resources assigned (reserved) to TE-LSPs that have already been established in computer network 100, designated by fields including, inter alia, TE-LSP Identification (ID) field 405, Links field 410, Reserved Resources field 415, and Priority field 420. The fields of the table 400 may be populated by a number of means, such as, e.g., through received IGP advertisements 300. TE-LSP ID field 405 identifies the particular TE-LSP for which the resources are reserved, such as, e.g., T1 and T2. Each TE-LSP (T1 and T2) is associated with a set of links over which the particular TE-LSP traverses in Links field 410, along with a reserved resource in Reserved Resources field 415. For example, assume that T1 traverses links from A to 200*a*, 200*a* to 200*b*, and 200*b* to B (denoted herein as "A-200*a*-200*b*-B"), reserving 3 MBps, and T2 traverses links C-200*c*-200*d*-D, also reserving 3 MBps. Each TE-LSP is also associated with a priority value in Priority field 420, as mentioned above, such as, e.g., a priority of 3 for T1 and a priority of 4 for T2. Those skilled in the art will understand that the table 400 as shown is merely representative, and is not meant to be limiting to the scope of the present invention. Other possible table arrangements and/or mechanisms known in the art could also be used to store the reserved resources, such as lists, pointers, flags, etc., which are within the scope of the present invention.

The present invention is directed to a technique for dynamically assigning priorities to TE-LSPs from a head-end node of a computer network. The novel technique increases the ability to place TE-LSPs that would be otherwise blocked by bandwidth fragmentation. Specifically, a head-end node allocates a range of priority values for groups of possible TE-LSP configurations, such as, e.g., groups by type and/or size of the possible TE-LSPs. When requesting a TE-LSP, the head-end node attempts to establish the TE-LSP by dynamically increasing a priority value of the TE-LSP within the corresponding range of priority values until adequate resources are available, at which time the head-end node may establish the TE-LSP. Upon expiration of a configurable timer, the head-end node dynamically decreases the priority value of the established TE-LSP within the corresponding range of priority values and determines whether the established TE-LSP can lower its priority yet still obtain adequate resources. If so, the head-end node may reestablish the TE-LSP at the lower priority value.

In accordance with one aspect of the present invention, the head-end node (e.g., a system administrator) assigns priority ranges to groups of possible TE-LSPs. Groups of possible TE-LSPs may comprise, e.g., various size configurations, TE-LSP type configurations, or other configurations, as well as any combinations of configurations. For example TE-LSPs requiring larger amounts of bandwidth (larger TE-LSPs) might be given a higher range of priority values than smaller TE-LSPs. Also, TE-LSP types (Class Types, CTs) may be assigned different ranges, such as, e.g., a higher range for sensitive data flows (e.g., Voice over Internet Protocol, VoIP or "voice") versus a lower range for less-sensitive data flows (e.g., data). Notably, while overlapping ranges are permitted, non-overlapping ranges may be assigned in order to assure desired preemption isolation across TE-LSP types, such as between voice and data.

FIG. 5 is a schematic block diagram of portions of an exemplary priority ranges table 500 that may be advantageously used with the present invention. The priority ranges table 500 contains a plurality of configured entries 520 that list priority ranges for various pre-defined groups of possible TE-LSPs that may be established in computer network 100, designated by fields including, inter alia, Type field 505, Size (e.g., in MBps) field 510, and Priority Range field 515. Type field 505 identifies various types (CTs) of possible TE-LSPs, such as, e.g., voice, data, and others. Those skilled in the art will understand that if no type distinctions need to be made, Type field 505 may be omitted, or each entry 520 for the different types in Type field 505 may contain the same information in the other fields, e.g., Size field 510 and Priority Range fields 515. Also, Type field 505 may simply contain only one entry 520 for all TE-LSP types if no distinctions need to be made.

Size field 510 contains one or more entries for each entry 520 that identify predefined ranges of possible TE-LSP sizes, while Priority Range field 515 contains a corresponding range of priority values for each size range. For example, the voice entry may be divided into ranges where any voice TE-LSP created requiring a bandwidth: (i) from 0 MBps to 1 MBps has a priority of 4 (notably, a single value); (ii) from 1.1 MBps to 3 MBps has a priority range from 4 to 3; (iii) from 3.1 MBps to 8 MBps has a priority range of 4 to 1; and iv) from 8.1 MBps and up has a priority of 0 (i.e., the largest voice TE-LSPs are un-preemptable). Further, the data entry may not be divided into size ranges, designated by the "ALL" indication, where all data TE-LSPs have the priority range in Priority Range field 515 from 7 to 5. Lastly, the other data entry may be divided into size ranges such that a majority of other type TE-LSPs sized from 0 MBps to 9 MBps (assuming a computer network supporting up to 10 MBps on certain links, as in network 100) has the lowest priority value of 7, while larger other type TE-LSPs sized from 9.1 MBps and up have a priority range from 7 to 6. Those skilled in the art will understand that if no size distinctions need to be made, Size field 510 may be omitted, or the Size field 510 for each entry 520 may contain an "ALL" indication (for all sizes of TE-LSPs). Also, in the event the table 500 is organized by size first (rather than type), Size field 510 may simply contain only one entry 520 for all sizes if no distinctions need to be made.

In this example, the voice and data types have non-overlapping priority ranges to provide for preemption isolation between those class types, (e.g., voice always preempts data), while the priority ranges for the data and other types are overlapping, so no preemption isolation exists therein. Notably, although no isolation exists, other type TE-LSPs are still preemptable by data TE-LSPs if necessary having, e.g., a priority of 5. Those skilled in the art will again also understand that the table 500 as shown is merely representative, and is not meant to be limiting to the scope of the present invention. Other possible table arrangements and/or mechanisms known in the art could also be used to store the reserved resources, such as lists, pointers, flags, etc., which are within the scope of the present invention.

Figure 6:
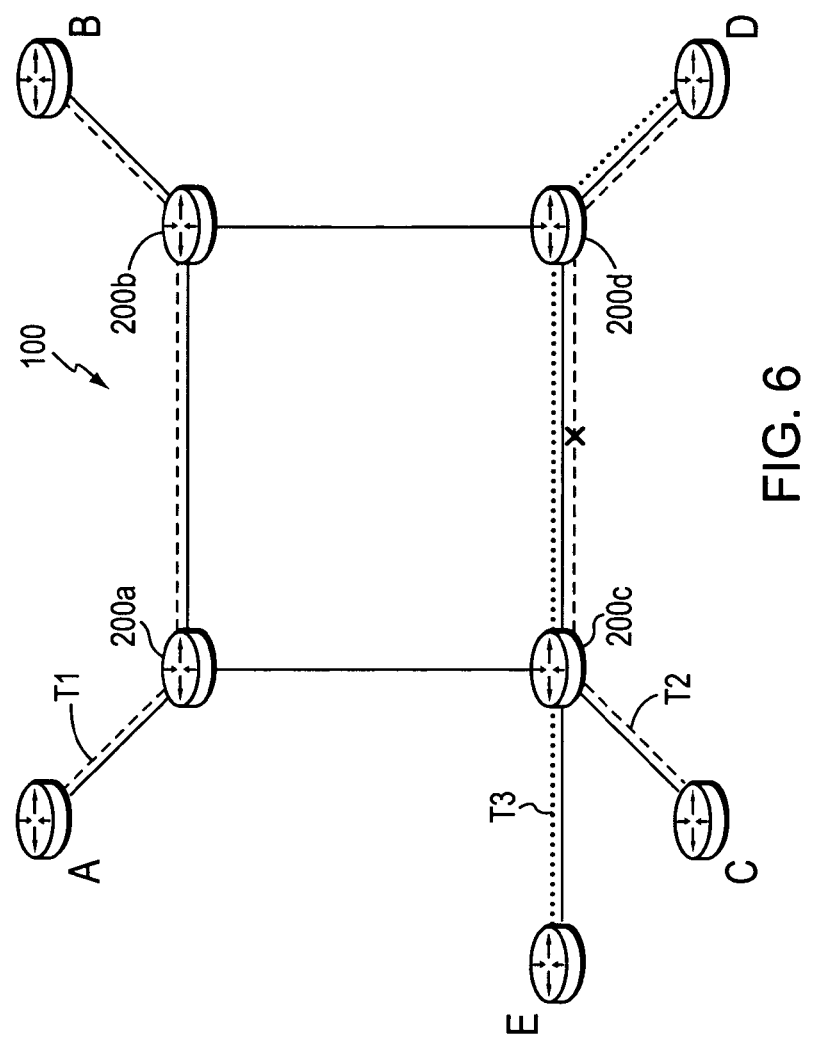
FIG. 6 is a schematic block diagram of the exemplary computer network illustrating an attempted TE-LSP in accordance with the present invention.

In accordance with another aspect of the present invention, the head-end node attempts to establish a TE-LSP by dynamically increasing a priority value of the TE-LSP within the corresponding range of priority values until adequate resources are available. FIG. 6 is a schematic block diagram of the exemplary computer network 100 illustrating an attempted TE-LSP in accordance with the present invention. Assume, for example, that head-end node E requests a voice TE-LSP (dotted line T3) to tail-end node D with a bandwidth of 8 MBps. According to Priority Ranges table 500, the corresponding priority for an 8 MBps voice TE-LSP is the range from 4 to 1. Assume also that T1 and T2 are voice TE-LSPs, having priorities of 3 and 4, respectively, as in Reserved Resources table 400. The head-end node E begins with the lowest value within the range, i.e. 4, and then steadily increments that priority value within the range, while attempting to obtain adequate resources for the TE-LSP T3 at each incremented priority level. Since adequate resources are not yet available at a priority of 4, the head-end node increases the priority to 3. With the higher priority, T3 is now at a higher priority than T2 (i.e., 3 is higher priority than 4). If T3 were to preempt T2, adequate resources would be available for T3 to reach D (E-200*c*-200*d*-D), since the 3 MBps used for T2 would be freed from the 10 MBps link from 200*c*-200*d*, such that at least 8 MBps would be available. Notably, the head-end node may either attempt to signal the establishment of the TE-LSP at each priority level, or it may instead perform a lookup to a locally stored list of current TE-LSPs and their priorities (e.g., Reserved Resources table 400) to determine internally whether adequate resources exist prior to signaling the TE-LSP. Once it is determined that adequate resources exist, the head-end node E attempts to establish the new TE-LSP, preempting (if necessary) any lower priority TE-LSPs.

In the event the head-end node E is configured to soft preempt, one or more remote head-end nodes (node C) of the soft-preempted TE-LSPs (T2) may send a notification indicating a burden on the remote head-end node to reroute its soft-preempted TE-LSP(s). If the head-end node of the preempting TE-LSP receives too many notifications, or "complaints," it may decide to cancel (retract) the soft-preemption. Otherwise, the TE-LSP is established, and the soft-preempted TE-LSPs are ultimately preempted and must be rerouted if possible.

In the illustrative embodiment described herein, the complaints are transmitted using IGP messages 300. Each remote head-end node (e.g., node C) of a preempted TE-LSP (e.g., T2) may create an IGP message 300 that is used to propagate ("advertise") the number of preempted TE-LSPs, particularly preempted TE-LSPs that it is unable to re-route, to other head-end nodes (e.g., the preempting nodes) or PCEs in its domain, e.g., its IGP area/level. Notably, the head-end node of a preempted TE-LSP may decide to delay the sending of the notification by a configurable amount of time in order to increase the probability of having a more complete knowledge of all of its potential preempted TE-LSP(s) before sending the notification. The IGP message 300 may also indicate other information about the preempted TE-LSPs, such as their respective priorities and/or sizes. The IGP message 300 is illustratively embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the preempted TE-LSP information, such as IGP Extension Object 700.

Figure 7:
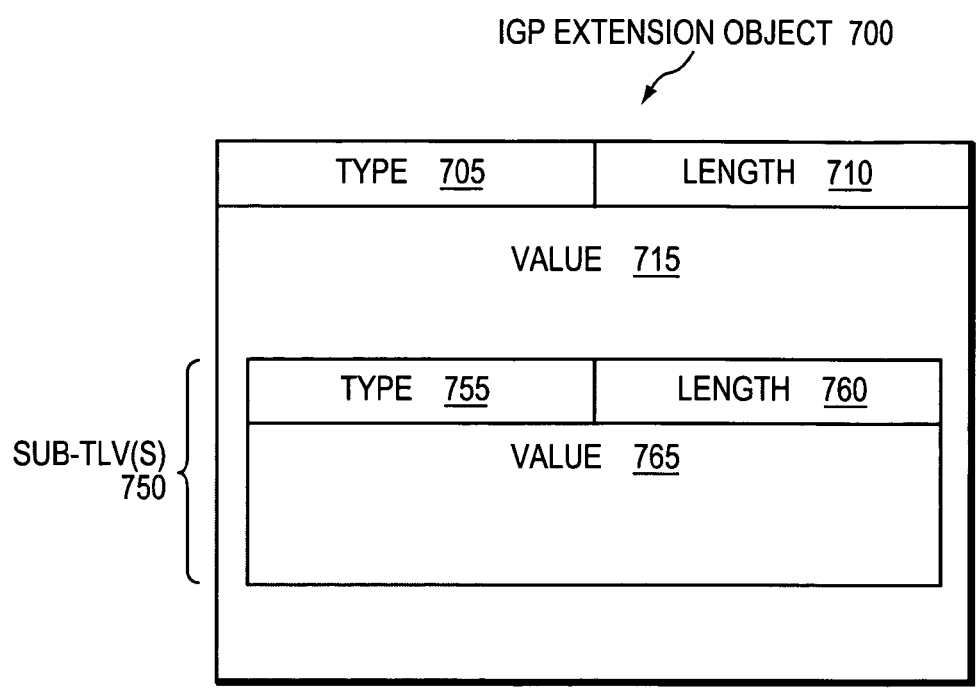
FIG. 7 is a schematic block diagram illustrating the format of an IGP Extension Object that may be advantageously used with the present invention.

FIG. 7 is a schematic block diagram illustrating an IGP Extension Object 700 encoded using a TLV that may be advantageously used with the present invention. The TLV encoding format is a general way to communicate information between nodes, such as routers. The TLV "attribute" 700 is used to identify a type (T) of information being communicated (conveyed), a length (L) of information to be conveyed and a value (V) of the actual information conveyed. The length (L) parameter contained in the length field 710 is typically implementation-specific and can denote the length from the beginning of the Type field 705 of the attribute 700 to the end. However, the length generally denotes the length of the Value (V) field 715 and not the Type (T) or Length (L) fields. The TLV encoded format may also comprise one or more non-ordered sub-TLVs 750 carried within the TLV "payload" (e.g. Value field 715), each having a Type field 755, Length field 760, and Value field 765. Illustratively, the IGP Extension Object 700 is embodied as a new TLV type carried, e.g., within an IS-IS Router Capability TLV, which is further described in Vasseur, et al., *IS-IS Extensions for Advertising Router Information* <draft-ietf-isis-caps-01.txt>, Internet Draft, April 2005, or within an OSPF Router Information IGP message, which is further described in Lindem, et al., *Extensions to OSPF for Advertising Optional Router Capabilities* <draft-ietf-ospf-cap-06.txt>, Internet Draft, February 2005, the contents of both of which are hereby incorporated by reference in their entirety. As an example, the Value field 715 may either contain the desired information in a predefined format, such as simply a number of TE-LSPs that the advertising head-end node has to reroute or the number of TE-LSPs it is unable to reroute, along with any additional information. As another example, the Value field 715 may contain one or more sub-TLVs, each having a number of non-reroutable TE-LSPs corresponding to a particular priority value (e.g., 2 TE-LSPs at priority 7, 1 TE-LSP at priority 6, etc.). Those skilled in the art will understand that other formats of the information are within the scope of the present invention, and that those formats shown herein for illustration are not meant to be limiting in any way.

As mentioned above, if the head-end node receives too many complaints, it may retract the soft-preemption, such as by sending an explicit retraction message known to those skilled in the art. For example, in the event the new TE-LSP would require the preemption of many (e.g., two hundred) smaller TE-LSPs, or if the preempted TE-LSPs are not reroutable, the head-end node may be configured to retract the soft-preemption because it is too much of a burden on the surrounding (existing) network. If the complaints are configurably minimal, or if the head-end node of the preempting TE-LSP is configured to ignore complaints, the new TE-LSP is successfully established, and the preempted TE-LSPs must be rerouted, if possible. Notably, while only one preemption is shown in the above example, the technique described herein may lead to multiple preemptions in order to obtain the necessary resources. Moreover, the resulting path for the new TE-LSP may not be the best path from the head-end node to the tail-end node. For instance, if the priorities of T1 and T2 were swapped, such that T1 were 4 and T2 were 3, then T1 would have been preempted first to make room for T3, and T3 would be on the longer path to tail-end node D.

Figure 8:
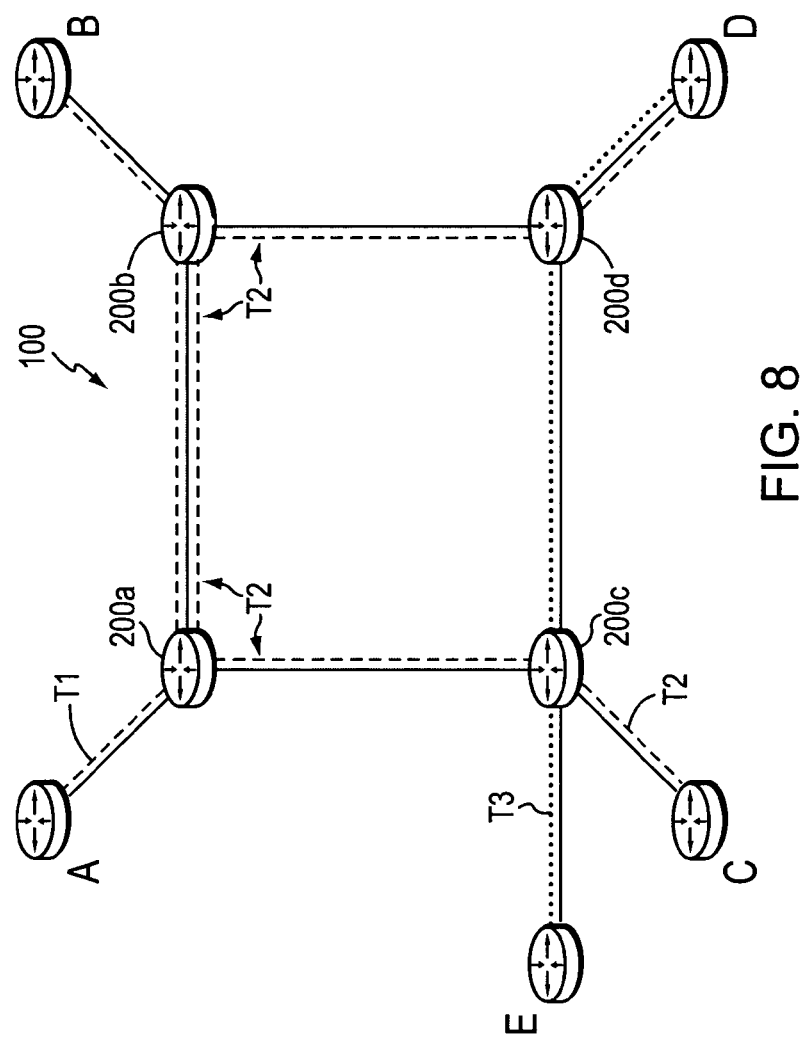
FIG. 8 is a schematic block diagram of the exemplary computer network illustrating a rerouted TE-LSP in accordance with the present invention.

Accordingly, T2 is preempted and subsequently torn down (or gracefully re-routed) to make room for T3. Head-end node C now attempts to reroute T2, which results in a new path sharing the link 200a-200b with T1 (10−3−3=4, or adequate bandwidth). FIG. 8 is a schematic block diagram of the exemplary computer network 100 illustrating a rerouted TE-LSP (T2) in accordance with the present invention. In particular, T2 has been rerouted such that its path is now C-200c-200a-200b-200d-D. Now that T1, T2, and T3 are all established, the bandwidth originally fragmented by T1 and T2 that blocked the establishment of T3 has been successfully defragmented.

In accordance with still another aspect of the present invention, upon expiration of a configurable timer, the head-end node of the preempting TE-LSP dynamically decreases the priority value of the established TE-LSP within the corresponding range of priority values and determines whether the TE-LSP can lower its priority yet still obtain adequate resources. The higher preemptions are used to force earlier established TE-LSPs to be rerouted to potentially defragment the bandwidth of the network 100, in order to make room for the newly requested TE-LSP. The priority of the new TE-LSP may then be lowered to as low a value as possible such that future TE-LSPs may have the opportunity to force new TE-LSP to be rerouted as well. Specifically, the timer may be configured to allow time for the system to reach a steady state after any establishments and preemptions. Namely, after head-end node E preempts T2 in order to establish T3, the timer may be long enough to allow T2 to reroute elsewhere. Notably, prior to expiration of the timer, particularly with longer timers, other TE-LSPs not involved with the preemption discussed herein may be established, preempted, torn down, failed, etc., thus freeing up or assigning other resources.

The head-end node E begins with the current priority value, 3, and then steadily decrements that priority value within the range, while determining if adequate resources for the TE-LSP T3 would be available at each lower priority level (e.g., either by signaling or local determination). For example, since the current priority is 3, the head-end node E decrements the priority to 4 to determine if a path is still available that has adequate resources (i.e., at least 8 MBps). In this situation, with no other TE-LSPs on the network other than those shown, there would still be enough resources over the same links for T3. The head-end node continues to decrement the priority and determine resource availability until either the lowest priority of the appropriate range is reached, or until a path is no longer available, in which case the head-end utilizes the last priority that resulted in available resources. The head-end node may then reestablish the TE-LSP at the lowest priority value within the range that still results in available resources. Because 4 is the lowest priority for this particular TE-LSP, the head-end node E reestablishes T3 with the new lower priority over the same links it currently traverses. As should be understood, if no paths are available with adequate resources, or if the new reestablishment generates too many complaints as described above, the head-end node continues to utilize the current TE-LSP at the current priority.

Notably, prior to reestablishing the TE-LSP the head-end node may first determine whether a reestablished TE-LSP has an acceptable cost, as compared with a cost of the current established TE-LSP. For instance, if the path available for reestablishing the TE-LSP were to take a different route than what it currently traverses, the cost values may be different. The route of E-200c-200a-200b-200d-D, for example, consists of 2 more links than the route of E-200c-200d-D. If each link has an equal cost value of, e.g., 1, the cost of the longer route is 60% larger, which may be configurably unacceptable to the head-end node E. If the new path is unacceptable due to cost, the head-end node is not required to reestablish the TE-LSP.

Figure 9:
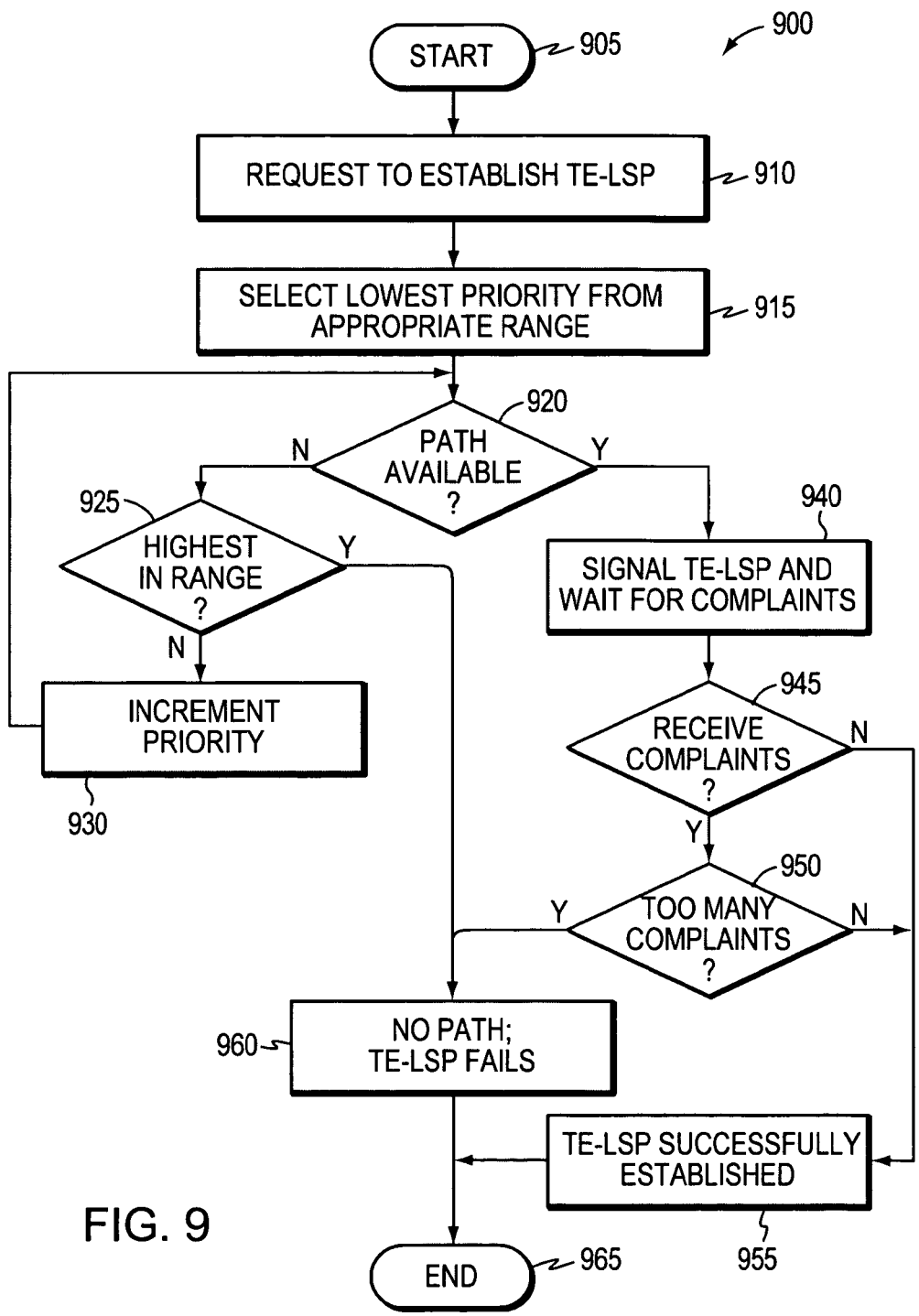
FIG. 9 is a flowchart illustrating a sequence of steps for dynamically increasing priorities in accordance with the present invention.

FIG. 9 is a flowchart illustrating a sequence of steps for dynamically increasing priorities in accordance with the present invention. Sequence 900 starts at step 905 and continues to step 910 where a request is made at a head-end node (E) to establish a new TE-LSP (T3), such as by a system administrator or an automated means. At step 915, the lowest priority value from an appropriate range, e.g., from Priority Ranges table 500, is selected as described in detail above. If no path is available with adequate resources at that priority value in step 920, the head-end node determines if the priority value is the highest value in the range at step 925. If it is not the highest, the priority is incremented to the next available value in step 930, and the head-end node again determines whether a path is available with adequate resources in step 920. If, on the other hand, the priority is the highest in the range at step 925, there are no available paths for the requested TE-LSP and the attempt to establish the TE-LSP fails in step 960. The sequence then ends at step 965.

If at step 920 a path with adequate resources is available, the head-end node signals the requested TE-LSP in step 940, which may either hard preempt or soft preempt other established TE-LSPs as described above. If configured for soft preemption, while the head-end node attempts to establish the requested TE-LSP and waits for complaints, the preempting node(s) along the path of the newly established TE-LSP notifies other remote head-end nodes that their respective TE-LSPs (if any) are being soft-preempted. At this time, the remote head-end nodes may reroute their TE-LSPs is possible, and/or may send complaints to the head-end node of the preempting TE-LSP. If the head-end node of the preempting TE-LSP receives no complaints at step 945 (e.g., hard preemption or no complaints), necessary preemptions are completed and the requested TE-LSP is successfully established in step 955. If complaints are received at step 945, and at step 950 the head-end node of the preempting TE-LSP receives too many complaints (configurable) as described above, the attempt to establish the TE-LSP fails in step 960 (retraction). Otherwise, at step 950 the head-end node ignores the complaints, and the requested TE-LSP is successfully established in step 955. The sequence ends at step 965.

Figure 10:
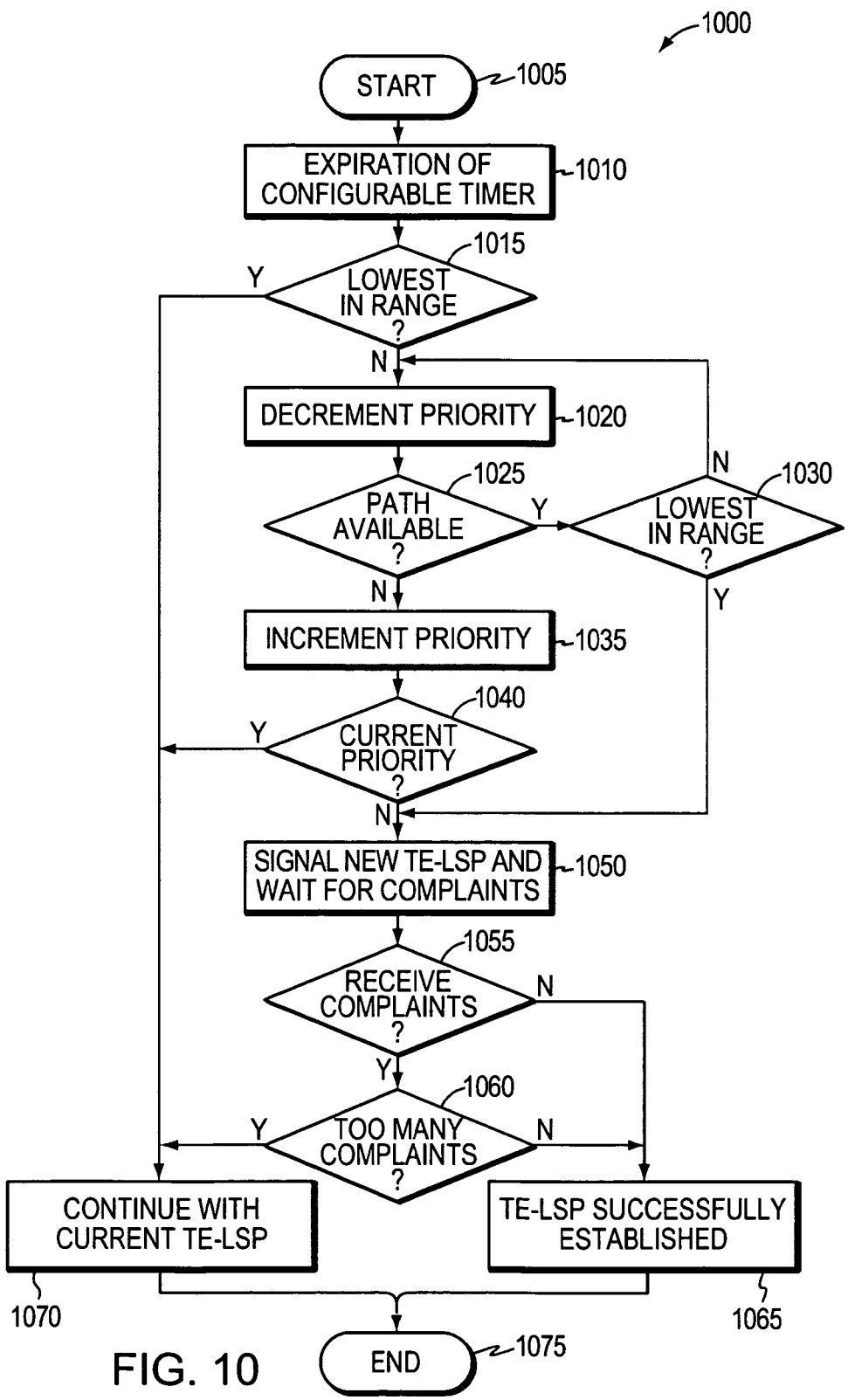
FIG. 10 is a flowchart illustrating a sequence of steps for dynamically decreasing priorities in accordance with the present invention.

FIG. 10 is a flowchart illustrating a sequence of steps for dynamically decreasing priorities in accordance with the present invention. Sequence 1000 starts at step 1005 and continues to step 1010 where a configurable timer expires after the establishment of a TE-LSP in accordance with the present invention. If the priority of the TE-LSP is already the lowest priority in the corresponding range of priorities in step 1015, the head-end node of the TE-LSP continues to utilize the current TE-LSP in step 1070, and the sequence ends at step 1075. If not already the lowest priority in the range, the head-end node decrements the priority in step 1020, and determines whether any paths are available with adequate resources for the current TE-LSP at the lower priority in step 1025. Notably, the head-end node may also determine whether the available path meets an acceptable cost, as described above. If there is an available path (e.g., the network has changed such that new resources are available), and the lower priority is not yet the lowest in the range in step 1030, the process returns to step 1020 to decrement the priority and try again. If the lower priority is the lowest in the range at step 1030, the sequence continues to step 1045 to reestablish the TE-LSP at the new priority as described below if the new path is acceptable.

If there is no path available with adequate resources for the TE-LSP in step 1025, the head-end node increments the priority in step 1035, such that the priority becomes a value that did produce a path with available resources. If this new priority is the current priority of the TE-LSP in step 1040 (i.e., where the first decremented priority value did not result in an available path), the head-end node continues to utilize the current TE-LSP in step 1070. If the new priority is not the current priority in step 1040, the sequence continues to step 1050 to signal the new TE-LSP at the new priority as described below.

If at step 1040 or 1030 a path with adequate resources is available at the lower priority, the head-end node signals the new TE-LSP in step 1050, which may either hard preempt or soft preempt other established TE-LSPs as described above. If configured for soft preemption, while the head-end node attempts to establish the new TE-LSP at the lower priority, the preempting node(s) along the path of the newly established TE-LSP notifies other remote head-end nodes that their respective TE-LSPs (if any) are being soft-preempted. At this time, the remote head-end nodes may reroute their TE-LSPs if possible, and/or may send complaints to the head-end node of the preempting TE-LSP. If the head-end node of the preempting TE-LSP receives no complaints at step 1055 (e.g., hard preemption or no complaints), necessary preemptions are completed and the new TE-LSP is successfully established at the lower priority in step 1065. If complaints are received at step 1055, and at step 1060 the head-end node of the preempting TE-LSP receives too many complaints (configurable) as described above, the attempt to establish the TE-LSP is canceled (retracted), and the head-end node continues to utilize the current TE-LSP in step 1070. Otherwise, at step 1060 the head-end node ignores the complaints, and the TE-LSP is successfully established in step 1065. The sequence ends at step 1075.

Advantageously, the novel technique dynamically assigns priorities to TE-LSPs of a computer network based on predefined priority ranges for groups of possible TE-LSPs. By dynamically adjusting the priority of TE-LSPs within the ranges, the inventive technique provides a mechanism for increasing the possibility of being able to place more TE-LSPs throughout a network, without arbitrary (and sometimes cumbersome) static assignments. Also, the novel technique advantageously prevents situations where a large number of smaller TE-LSPs is preempted which may not be re-routable in order to place a larger TE-LSP.

While there has been shown and described an illustrative embodiment that load balances TE-LSPs at a head-end node of the TE-LSP, it is to be understood that various other adaptations and modifications may be made within the spirit and scope of the present invention. For example, while the above description describes performing the technique at the head-end LSR, the invention may also be advantageously used with PCEs. Also, while the invention has been shown and described herein using RSVP signaling messages to exchange reservation request/response information, the invention may also be advantageously used with other request/response signaling exchanges, or other messages exchanged between the nodes that are known to those skilled in the art that could be readily adapted to accommodate an exchange of reservation request/response information as described herein.

Notably, some parts of the invention have been illustratively shown and described herein using numbers to designate priority for reservations such that the higher the number the lower the priority of the reservation. This is not intended to be a limitation of the invention. Other techniques may be used to indicate priority of reservations. For example, a technique that employs a scheme where numbers that are higher in value are considered higher in priority than numbers that are lower in value may take advantage of the inventive technique. Also, a bit-wise mask may be used to indicate priority.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   receiving, at a node of a computer network, a request to establish a traffic engineering (TE) label switched path (LSP);
   accessing a pre-defined range of preemption-priority values that may be used with the requested TE-LSP, the range of preemption-priority values spanning from a lowest preemption-priority value that may be used with the requested TE-LSP to a highest preemption-priority value that may be used with the requested TE-LSP;
   determining a preemption-priority value to use with the requested TE-LSP, the determined preemption-priority value to be a lowest value within the pre-defined range of preemption-priority values at which adequate network resources to accommodate the requested TE-LSP would be available;
   signaling the requested TE-LSP with the determined preemption-priority value to one or more other nodes within the computer network;
   receiving notifications from the one or more other nodes within the computer network indicating information about other TE-LSPs that would be preempted if the requested TE-LSP were established at the determined preemption-priority value; and
   in response to the information regarding other TE-LSPs that would be preempted, determining whether to proceed with establishment of the requested TE-LSP at the determined preemption-priority value.

2. The method of claim 1, wherein the information about other TE-LSPs that would be preempted is a number of other TE-LSPs that would be preempted, and the determining whether to proceed further comprises:
   proceeding with establishment of the requested TE-LSP at the determined preemption-priority value if the number of other TE-LSPs that would be preempted is below a threshold; and
   cancelling establishment of the requested TE-LSP at the determined preemption-priority value if the number of other TE-LSPs that would be preempted is above the threshold.

3. The method of claim 1, wherein the information about other TE-LSPs that would be preempted is a number of other TE-LSPs that would be preempted and cannot be rerouted, and the determining whether to proceed further comprises:
   proceeding with establishment of the requested TE-LSP at the determined preemption-priority value if the number of other TE-LSPs that would be preempted and cannot be rerouted is below a threshold; and
   cancelling establishment of the requested TE-LSP at the determined preemption-priority value if the number of other TE-LSPs that would be preempted and cannot be rerouted is above the threshold.

4. The method of claim 1, wherein the notifications are Interior Gateway Protocol (IGP) Advertisements that include an IGP Extension Object that stores information about other TE-LSPs that would be preempted.

5. The method of claim 1, wherein the determining a preemption-priority value further comprises:
   beginning at the lowest preemption-priority value, checking if adequate network resources to accommodate the requested TE-LSP would be available and, if not, increasing preemption-priority value within the pre-defined range of preemption-priority values until a value is reached where adequate network resources to accommodate the requested TE-LSP would be available.

6. The method of claim 1, wherein the accessing further comprises:
   determining a group of possible TE-LSP configurations, from among a plurality of groups of possible TE-LSP configurations, to which the requested TE-LSP belongs; and
   accessing a range of preemption-priority values stored in association with the group of possible TE-LSP configurations.

7. The method of claim 6, wherein the plurality of groups of possible TE-LSP configurations are based on TE-LSP size ranges.

8. The method of claim 6, wherein the plurality of groups of possible TE-LSP configurations are based on TE-LSP traffic types.

9. The method of claim 1, wherein the determining a preemption-priority value further comprises:
   performing a lookup on a locally stored data structure that indicates current TE-LSPs in the computer network and priorities associated with the current TE-LSPs.

10. The method of claim 1, wherein the node is a head-end node of the requested TE-LSP, and the accessing, the determining a preemption-priority value, the signaling, the receiving, and the determining whether to proceed are performed by the head-end node.

11. An apparatus comprising:
    a network interface configured to couple the apparatus to a computer network;
    a processor configured to execute software processes; and
    a memory coupled to the processor and configured to store a priority ranges table that indicates a pre-defined range of preemption-priority values that may be used with a requested TE-LSP, a reserved resources table that indicates current TE-LSPs in the computer network and priorities associated with the current TE-LSPs, and a TE services process executable on the processor, the TE services process configured to
       determine a preemption-priority value to use with the requested TE-LSP, the determined preemption-priority value to be a lowest value within the pre-defined range of preemption-priority values at which adequate network resources to accommodate the requested TE-LSP would be available, based on the reserved resources table,
       signal the requested TE-LSP with the determined preemption-priority value over the network interface to one or more other nodes within the computer network, and
       in response to information about other TE-LSPs that would be preempted if the requested TE-LSP were established at the determined preemption-priority value, determine whether to proceed with establishment of the requested TE-LSP at the determined preemption-priority value.

12. The apparatus of claim 11, wherein the information about other TE-LSPs that would be preempted is a number of other TE-LSPs that would be preempted, and the TE process is further configured to:
    proceed with establishment of the requested TE-LSP at the determined preemption-priority value if the number of other TE-LSPs that would be preempted is below a threshold; and
    cancel establishment of the requested TE-LSP at the determined preemption-priority value if the number of other TE-LSPs that would be preempted is above the threshold.

13. The apparatus of claim 11, wherein the information about other TE-LSPs that would be preempted is a number of other TE-LSPs that would be preempted and cannot be rerouted, and the TE process is further configured to:
  proceed with establishment of the requested TE-LSP at the determined preemption-priority value if the number of other TE-LSPs that would be preempted and cannot be rerouted is below a threshold; and
  cancel establishment of the requested TE-LSP at the determined preemption-priority value if the number of other TE-LSPs that would be preempted and cannot be rerouted is above the threshold.

14. The apparatus of claim 11, wherein the notifications are Interior Gateway Protocol (IGP) Advertisements that include an IGP Extension Object that stores information about other TE-LSPs that would be preempted.

15. The apparatus of claim 11, wherein the TE services process is configure to determine a preemption-priority value by, beginning at a lowest preemption-priority value of the pre-defined range of preemption-priority values, checking the reserved resources table to determine if adequate network resources to accommodate the requested TE-LSP would be available and, if not, increasing preemption-priority value within the pre-defined range of preemption-priority values until a value is reached where the reserved resources table indicates there would be adequate network resources to accommodate the requested TE-LSP.

16. The method of claim 11, wherein the priority ranges table includes a plurality of entries that each indicate a group of possible TE-LSP configurations and a range of preemption-priority values for that group of possible TE-LSP configurations.

17. Software encoded on one or more non-transitory computer readable media that when executed on a processor is operable to:
  in response to a request to establish a traffic engineering (TE) label switched path (LSP), access a pre-defined range of preemption-priority values that may be used with the requested TE-LSP, the range of preemption-priority values spanning from a lowest preemption-priority value that may be used with the requested TE-LSP to a highest preemption-priority value that may be used with the requested TE-LSP;
  determine a preemption-priority value to use with the requested TE-LSP, the determined preemption-priority value to be a lowest value within the pre-defined range of preemption-priority values at which adequate network resources to accommodate the requested TE-LSP would be available;
  determine a number of TE-LSPs that would be preempted if the requested TE-LSP were established at the determined preemption-priority value;
  establish the requested TE-LSP at the determined preemption-priority value if the number of other TE-LSPs that would be preempted is below a threshold; and
  cancel establishment of the requested TE-LSP at the determined preemption-priority value if the number of other TE-LSPs that would be preempted is above the threshold.

18. The software encoded on one or more non-transitory computer readable media of claim 17, wherein the number of TE-LSPs that would be preempted are a number of TE-LSPs that would be preempted and cannot be rerouted.

19. The software encoded on one or more non-transitory computer readable media of claim 17, comprising additional software that when executed on a processor is operable to:
  signal the requested TE-LSP with the determined preemption-priority value to one or more other nodes;
  receiving notifications from the one or more other nodes indicating the number of other TE-LSPs that would be preempted if the requested TE-LSP were established at the determined preemption-priority value.

20. The software encoded on one or more non-transitory computer readable media of claim 17, comprising additional software that when executed on a processor is operable to:
  perform a lookup on a locally stored data structure that indicates current TE-LSPs and priorities associated with the current TE-LSPs.

* * * * *